United States Patent
Brown et al.

(10) Patent No.: US 7,168,573 B2
(45) Date of Patent: *Jan. 30, 2007

(54) ENVIRONMENTALLY FRIENDLY FILTER CARTRIDGE

(75) Inventors: Gene W. Brown, Kearney, NE (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 345 days.

This patent is subject to a terminal disclaimer.

(21) Appl. No.: 10/457,187

(22) Filed: Jun. 9, 2003

(65) Prior Publication Data

US 2003/0226800 A1 Dec. 11, 2003

Related U.S. Application Data (60) Provisional application No. 60/386,980, filed on Jun. 7, 2002, provisional application No. 60/387,235, filed on Jun. 7, 2002.

(51) Int. Cl.
*B01D 29/07* (2006.01)
*B01D 35/01* (2006.01)
*B01D 27/06* (2006.01)
*B01D 29/00* (2006.01)
*B01D 35/00* (2006.01)

(52) U.S. Cl. .................. 210/472; 210/238; 210/470; 210/436; 210/232; 210/493.1; 210/441; 210/450; 210/451; 210/455

(58) Field of Classification Search .................. None
See application file for complete search history.

(56) References Cited

U.S. PATENT DOCUMENTS

| | | | |
|---|---|---|---|
| 2,196,821 A | 4/1940 | Arnold | |
| 2,411,539 A | 11/1946 | Gunn | |
| 2,537,992 A | 1/1951 | Gross et al. | |
| 2,601,404 A | 6/1952 | Lasky | |
| 2,843,268 A | 7/1958 | Kennedy | |
| 2,905,327 A | 9/1959 | Phillips | |
| 2,942,572 A | 6/1960 | Pall | |

(Continued)

FOREIGN PATENT DOCUMENTS

EP 0287527 A2 10/1988

(Continued)

*Primary Examiner*—Krishnan S. Menon
(74) *Attorney, Agent, or Firm*—Leydig, Voit & Mayer, Ltd (57) ABSTRACT

A filter cartridge which is environmentally friendly in that it is made up of components which are all incinerateable. The ends of a filter element are sealed using potting compound and plastic endcaps. The upper endcap, which is closed, has a pressure relief aperture associated therewith to prevent bowing. In a plugged filter condition the high-downward pressure introduced on the upper endcap is compensated by providing the cartridge with centering ribs which bottom on an associated ledge in the housing to provide a positive stop for the top endcap, preventing it from being driven down into and through the filter element. Rubber gaskets are associated with the respective endcaps, and are reliably secured to the endcaps by being snap fit into grooves molded into the plastic of the endcaps. The lower endcap utilizes a simple radial seal gasket which is both highly effective and also positioned to avoid structural crushing forces on the cartridge. A keying system prevents the installation of improper filters.

8 Claims, 7 Drawing Sheets

U.S. PATENT DOCUMENTS

| | | |
|---|---|---|
| 3,056,499 A | 10/1962 | Emond |
| 4,062,781 A | 12/1977 | Strauss et al. |
| 4,324,660 A | 4/1982 | Peyton et al. |
| 4,501,660 A | 2/1985 | Hebert |
| 4,557,829 A | 12/1985 | Fields |
| 4,655,914 A | 4/1987 | Wada |
| 4,733,449 A | 3/1988 | Spearman |
| 4,802,979 A | 2/1989 | Medley, III |
| 4,832,836 A | 5/1989 | Selsdon |
| 4,871,455 A * | 10/1989 | Terhune et al. ............. 210/232 |
| 4,872,976 A | 10/1989 | Cudaback |
| 5,035,797 A * | 7/1991 | Janik .......................... 210/232 |
| 5,078,877 A | 1/1992 | Cudaback et al. |
| 5,084,170 A * | 1/1992 | Janik et al. ................. 210/232 |
| 5,089,131 A | 2/1992 | Gentry |
| 5,180,490 A | 1/1993 | Eihusen et al. |
| 5,234,585 A | 8/1993 | Zuk |
| 5,236,579 A | 8/1993 | Janik et al. |
| 5,342,511 A | 8/1994 | Brown et al. |
| 5,447,627 A | 9/1995 | Loafman et al. |
| 5,490,930 A | 2/1996 | Krull |
| 5,525,226 A | 6/1996 | Brown et al. |
| 5,527,463 A | 6/1996 | Morgan |
| 5,538,542 A | 7/1996 | Watanabe et al. |
| 5,538,543 A | 7/1996 | Watanabe et al. |
| 5,660,802 A | 8/1997 | Archer et al. |
| 5,685,985 A | 11/1997 | Brown et al. |
| 5,695,637 A | 12/1997 | Jiang et al. |
| 5,702,592 A | 12/1997 | Suri et al. |
| 5,702,602 A | 12/1997 | Brown et al. |
| 5,738,785 A | 4/1998 | Brown et al. |
| 5,855,634 A | 1/1999 | Berfield |
| 5,888,383 A | 3/1999 | Cox |
| 5,904,357 A | 5/1999 | Demirdogen et al. |
| 5,906,736 A | 5/1999 | Bounnakhom et al. |
| 5,996,810 A | 12/1999 | Bounnakhom et al. |
| 6,024,229 A | 2/2000 | Ayers |
| 6,045,693 A | 4/2000 | Miller et al. |
| 6,235,194 B1 | 5/2001 | Jousset |
| 6,322,697 B1 | 11/2001 | Hacker et al. |
| 6,478,958 B1 | 11/2002 | Beard et al. |
| 6,555,000 B2 | 4/2003 | Knight |

FOREIGN PATENT DOCUMENTS

| | | |
|---|---|---|
| WO | WO 86/03687 A1 | 7/1986 |

* cited by examiner

ENVIRONMENTALLY FRIENDLY FILTER CARTRIDGE

CROSS-REFERENCE TO RELATED PATENT APPLICATIONS

This patent application claims the benefit of U.S. Provisional Patent Application Nos. 60/386,980 and 60/387,235, both filed on Jun. 7, 2002.

FIELD OF THE INVENTION

This invention pertains to filters, and more particularly to an environmentally friendly filter cartridge.

BACKGROUND OF THE INVENTION

Most conventional filters and filter cartridges present a disposal problem. Driven by ease of installation, many applications have gone to self-contained spin-on cartridges. These have a metal outer case, a metal base plate, and other metal components within the filter. Replaceable cartridges also have significant metal components, often in the form of centertubes or support grids for supporting the filter element, and metal endcaps. Thus, significant elements of a filter will not burn thus preventing the use of incineration for relatively complete disposal of the spent filters or filter cartridges.

BRIEF SUMMARY OF THE INVENTION

In view of the foregoing, it is a general aim of the present invention to provide an environmentally friendly filter cartridge, capable of being incinerated, and which is economical to manufacture and provides for simple and reliable installation. The cartridge is environmentally friendly in that it contains no metallic parts.

In practicing the invention, the cartridge can be made from a limited class of materials, preferably all incinerateable. The materials include the media (normally cellulose or perhaps polyester with plastic backing), two plastic endcaps, two rubber gaskets, and potting compound (epoxy, plastisol, hot melt or urethane), all of which are incinerateable. The cartridge itself has no centertube; to the extent internal support is required, it is built into the housing, which is compatible with the cartridge. The fact that the cartridge will burn and it is lightweight (due to no metal parts) simplifies disposal.

It is a feature of the invention that pre-molded plastic endcaps are utilized in the filter along with structures which compensate for the reduction in strength of plastic endcaps over conventional metal endcaps.

In a particular embodiment, the invention provides an environmentally friendly filter cartridge containing no metal parts. The cartridge includes a cylindrical filter element having an internal bore, which has no integral supporting centertube. A pre-molded plastic endcap, having an open center corresponding to the internal bore of the filter, it is ealed to the filter element at a first end thereof. An annular groove formed near the outer periphery of the first endcap has a radial seal gasket fitted therein. The radial seal gasket has a peripheral mounting bead sized to be stretched and snap fit into the annular groove. The radial seal gasket has a depending skirt coaxial with the filter element and positioned at about the outer periphery of the filter element. A second pre-molded plastic endcap is provided having a closed end. The second end of the filter element is sealed to the second endcap. The second endcap also has an annular groove at the outer periphery thereof. In this case a disc-like axial seal is stretch fit into the groove to project from the outer periphery of the second endcap to provide an axial seal. A pressure equalizing aperture is formed in the second endcap for equalizing the pressure differential across the second endcap during filter operation. Support shoulders associated with the lower portion of the second endcap serve to resist crushing forces applied to the second endcap during filter operation.

Subsidiary features of the invention include a handle also formed in the second endcap for facilitating user manipulation of the filter cartridge.

The filter cartridge, according to the invention, is used in a housing, which receives the filter cartridge. The housing has a centertube fixed therein for supporting the inner bore of a cartridge when inserted in the housing. A cover is threaded onto the housing in such a way as to compress the axial seal gasket between the cover and the housing. The pressure equalization apertures serves to equalize the pressures between the upper endcap and the cover to prevent bowing of the plastic of the second endcap under operating pressure.

In certain applications, the upper endcap has a plurality of tapered ribs positioned near the periphery thereof and oriented to assist in centering the cartridge in the housing. Shoulders formed on the tapered ribs interfit with an annular ridge in the housing for supporting the shoulders to resist crushing pressures on the filters under operating conditions.

In certain instances, the filter also has a plurality of keys associated with the second endcap. The key positions are on the underside of the endcap facing toward the centertube. The housing centertube has a top surface having a plurality of keyed positions. A slot is formed in a selected one of the keyed positions to correspond with the position of the key on the inside of the second endcap.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
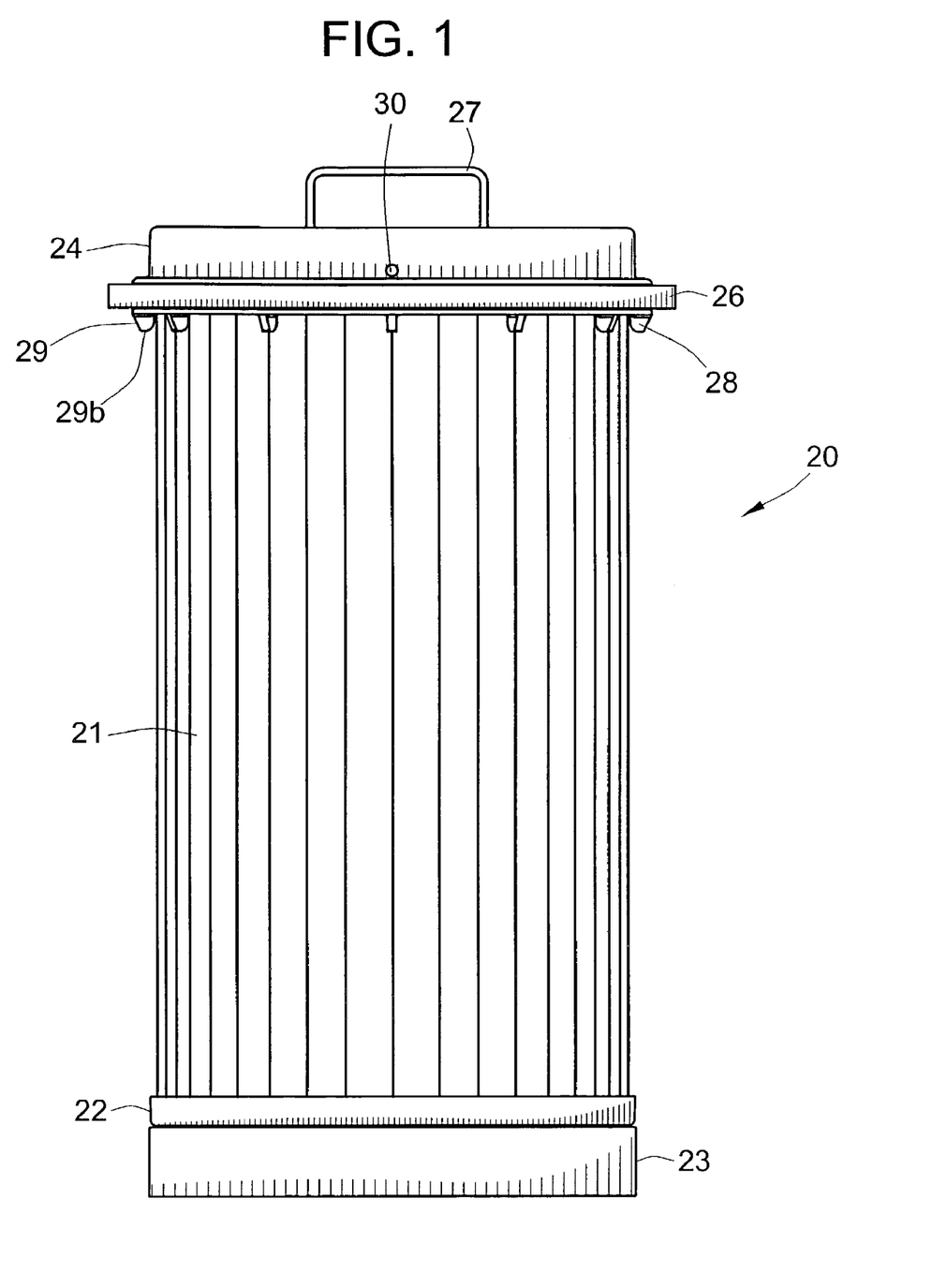
FIG. 1 is an elevational view of a filter constructed in accordance with the present invention.

Turning then to FIG. 1, there is shown, in elevation, a cartridge 20 constructed in accordance with the present invention. This disclosure of the cartridge 20 is intended to be general, since the cartridge 20 can be configured for different applications. More particularly the cartridge can have elements configured such that it will be used as a fuel filter, a full flow oil filter, a hydraulic filter, or a bypass oil filter. The cartridge features, which will be described in detail herein, will be common to any of the foregoing applications. The universal housing, which will also be described below, is readily reconfigureable for the foregoing applications, without the necessity for change of the characteristics of the filter cartridge. Referring back to FIG. 1, it will be seen that the filter cartridge 20 includes a filter element 21 having a lower endcap 22, which carries a radial seal gasket 23. An upper endcap 24, also secured to the filter element 21, provides a number of features, including a mechanism for supporting an axial seal gasket 26, an integrally molded handle 27 on the top of the endcap 24, and centering beveled projections 28, which both serve to center the cartridge 20 as it is inserted into the housing and which also have lower shoulders 29b thereon which tend to support the plastic endcap 24 on the housing to resist crushing forces in filter operation. Also of note is a pressure equalization aperture 30 formed in the upper endcap 24, which serves to equalize the differential pressure across the endcap 24 to prevent bowing and possible fracture of the endcap 24.

Figure 2:
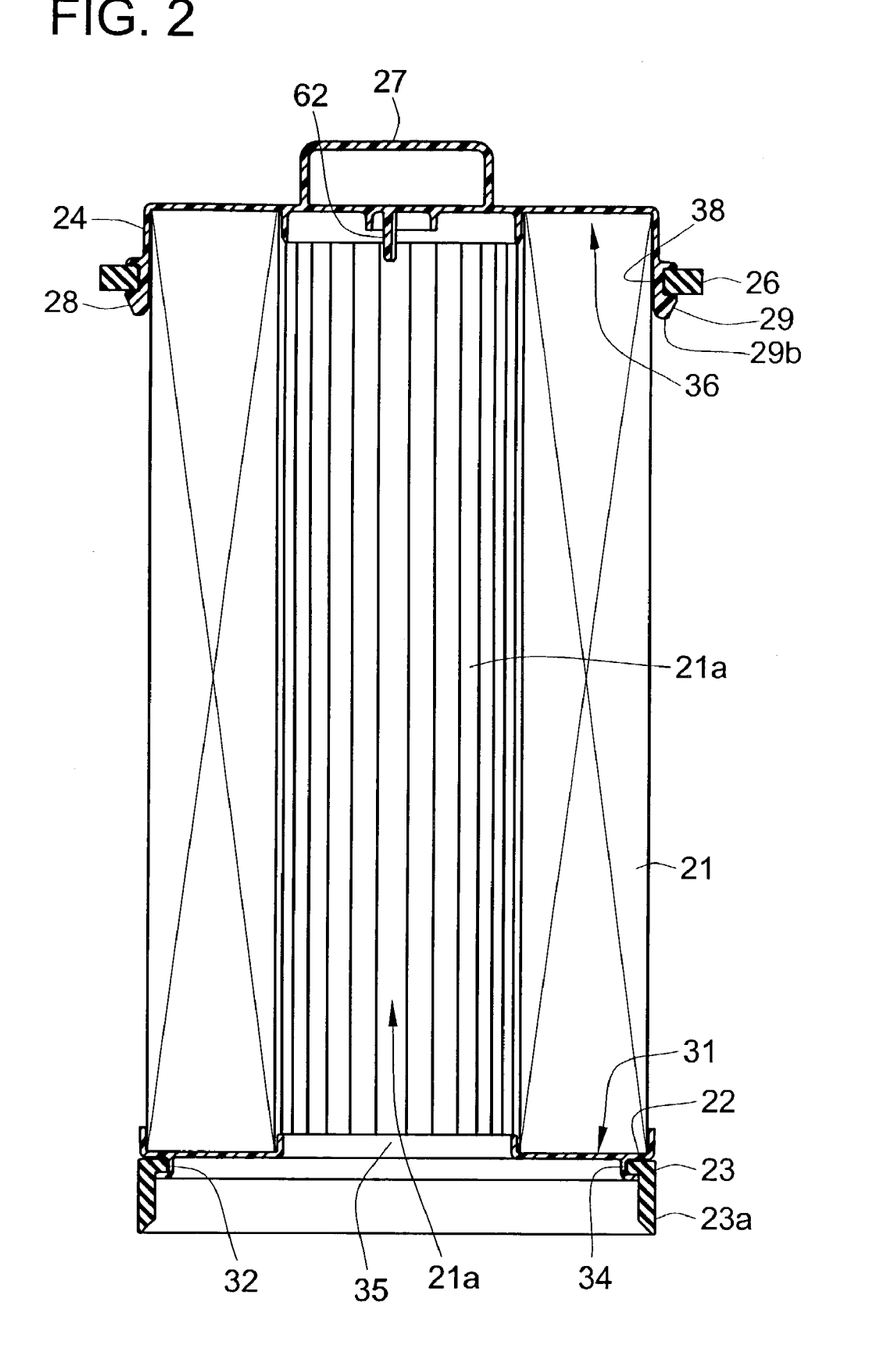
FIG. 2 is an elevational section taken through the filter of FIG. 1 in a plane parallel to the paper surface.

The cross-sectional view of FIG. 2 reveals additional constructional details of the filter of FIG. 1. There it will be seen that the lower endcap 22, which is made of pre-molded plastic, provides an upstanding annular channel 31 into, which a first end of the filter element 21 is fit and potted. Potting can be accomplished with any conventional potting material used in this art, which includes epoxy, plastisol, hot melt or urethane. The particular potting material used may depend upon the nature of the application to which the filter is put. The potting tends to seal the lower portions of all of the pleats into a unitary endcap. The lower endcap 22 has a central opening 35 for passing fluid which is passed through the filter to the central bore thereof to a housing outlet (not shown in FIG. 2).

The filter element 20 has an outer circumference and an open inner bore 21a. Normally flow through the filter is from the outside in, making the internal bore 21a the area which receives and passes to an external conduit the filtered fluid. It is possible, of course, to operate the filter in the opposite direction in which the internal bore 21a would be the filter inlet, and clean filtered fluid would be obtained at the outside periphery of the filter.

The lower endcap 22 also has an annular groove 32 formed therein near the periphery of the filter. The radial seal gasket 23 has an enlarged in-turned annular bead 34 which is sized to be stretched and snap fit into the groove 32. In that way the gasket 23 is positively and reliably locked in place on the endcap 22. The gasket 23 has a depending skirt 23a which depends from the endcap 22 and has a radius very near the outside radius of the filter element 21, so that the axial seal performs its sealing function near the outside of the filter cartridge 20 for reasons to be explained below.

FIG. 2 also shows the upper endcap 24 which, like the endcap 22, is a pre-molded plastic element. In the case of the upper endcap 24, the endcap has a closed end. An internal annular channel 36 is provided for receiving the second end of the filter element 21. Like the first end, the second end is also potted into the associated channel in the endcap.

The upper endcap 24 has an annular groove 38 preferably located at the outer periphery thereof. A disc-like rubber annular gasket 26, which serves as an axial seal gasket, is sized so that it can be stretched and snap fit into the groove 38. In this way, the gasket is reliably and securely positioned for automatic installation with the cartridge 20.

Figure 6:
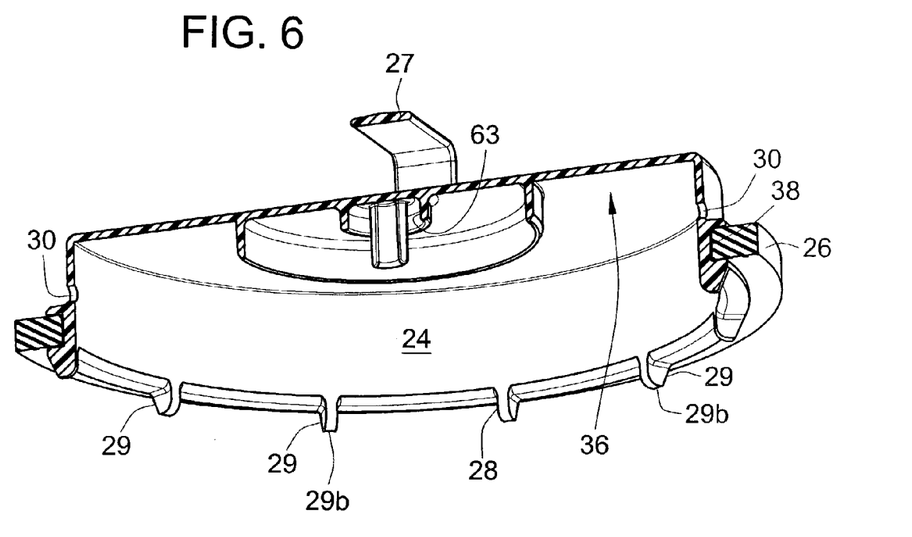
FIG. 6 is a partial diagram illustrating the upper endcap, with filter removed, to better show the tapered centering guides and shoulders.

FIG. 2 also illustrates the centering ribs 28 (see also FIG. 6 for an enlarged view). It will be seen that the ribs 28 each have an angled face 29 which, as suggested in FIG. 7, causes the filter cartridge to self center as it is slid into the housing. The housing has a circular ridge 29a (see also FIG. 7) over which the angled projections 29 ride to ultimately seat the lower shoulders 29b on a ledge 29c formed in the housing. The dimensions are such that the upper endcap 24 firmly seats the shoulders 29b on the ledge 29c so that additional downward force on the endcap 24 created by pressures during operation of the filter will not drive the endcap 24 into the housing and crush the filter. These ribs 28, in conjunction with the pressure relief port 30 in the upper endcap 24, are significant features in allowing the use of a plastic endcap in an application which heretofore had required the structural stability of a metal endcap.

Also of note in FIG. 2 is the integrally molded handle 27 formed on the upper surface of the upper endcap 24. Also, as a subsidiary feature, the inside surface of the upper endcap 24 is provided with a key feature generally indicated at 62, which will be described in greater detail below.

Figure 7:
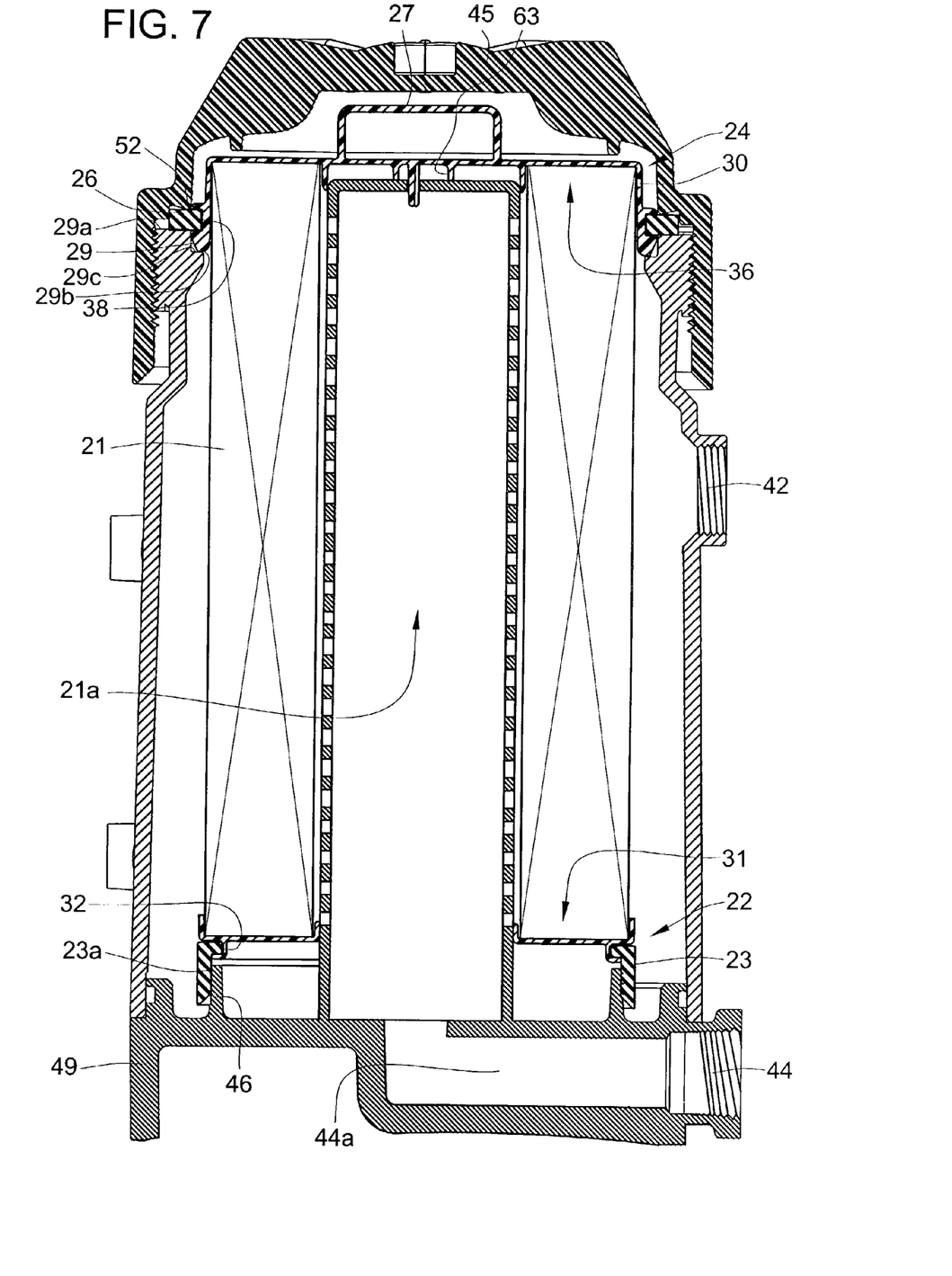
FIG. 7 is an elevational cross-section showing a housing used with the filter of FIG. 1.

FIG. 7 shows an exemplary housing into which the filter of FIG. 1 can be fit. In the illustrated housing, inlet fluid is provided through an inlet port 42. The housing also has an outlet port 44, which is connected by an internal passage 44a in the housing to the center lower portion of the filter, in fluid communication with the bore 21a. The housing has a removable cap 45 which is threaded onto the housing to compress the axial seal gasket 26 set in the annular groove 38 on the periphery of the upper endcap 24. Also of note is the bottom 49 of the housing, which may be removably secured in place by fasteners such as bolts. This allows the installation of different housing bottoms for different applications, such as a bottom including a sump for a fuel filter application, or a concave bottom for high pressure lubrication applications.

Figure 5:
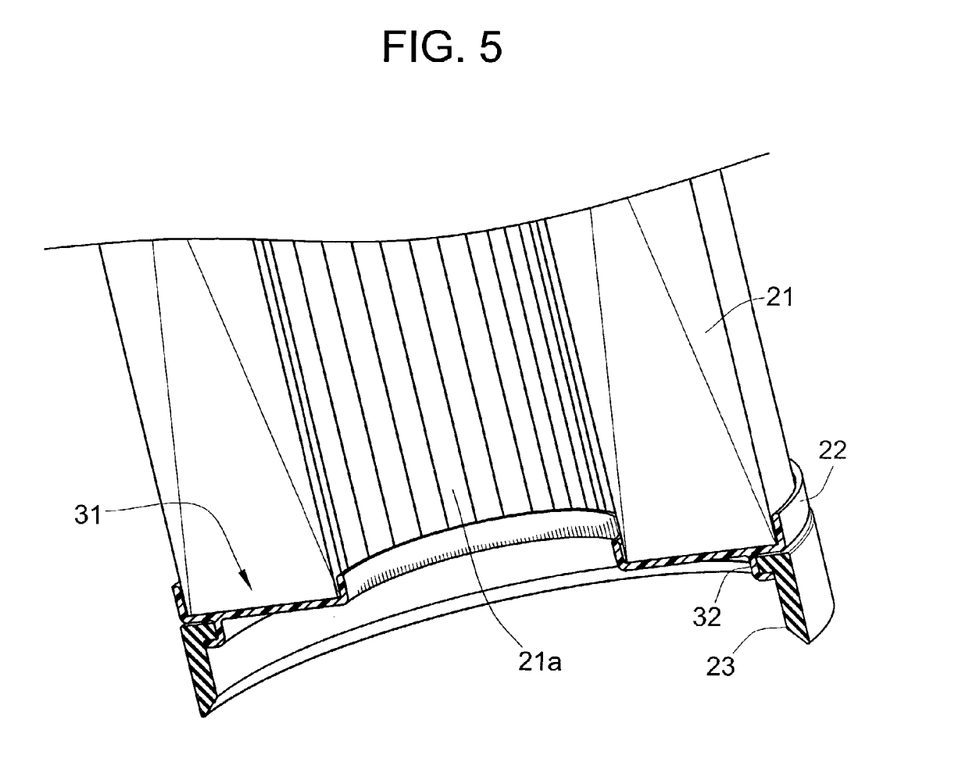
FIG. 5 is a partial enlarged view illustrating the lower endcap and radial seal gasket.

The lower portion of the housing has an annular flange 46 which provides a sealing surface acted upon by the skirt 23a of the radial seal gasket 23 which, it is recalled, is carried in the groove 32 of the lower endcap 22. The seating of the radial seal gasket 23 into the groove 32 is better illustrated in the enlarged partial view of FIG. 5, while the interaction between the radial seal 23 and the housing flange 46 is best shown in FIG. 7. Use of a radial seal in this position is significant in that the gasket is positioned near the outer periphery of the filter so that the pressure differential serves to enhance the sealing action. The gasket 23 seals radially between itself, the endcap 22 that supports it, and the housing flange 46. This seal separates the filtered and unfiltered fluid. Use of a radial seal for this component utilizes the pressure differential across the filter to assist the sealing function by forcing the radial seal gasket 23 against both the endcap 22, which supports it and the housing flange 46 of the filter housing. In addition, placing the seal at the external periphery tends to put a pressure differential across the lower endcap which is positive at the outside of the filter (and therefore the inside of the endcap) and negative at the bottom of the endcap. This pressure differential tends to put the pleated paper filter in tension, which the media is capable of resisting. Moving the skirt 23a of the gasket inboard would tend to put at least part of the media in compression, which is not so readily resisted by pleated paper media. Keeping the media in tension is particularly important in resisting what would otherwise be crushing forces encountered in a plugged filter condition.

Returning to the upper endcap 24, it will be seen that at least one pressure relief port 30 is formed in the upper endcap 24. The purpose of this port is to equalize the pressure across the upper endcap 24 to prevent bowing or possible fracture of the endcap 24. This is accomplished by, in effect, allowing a small portion of the unfiltered fluid on the outside of the cartridge to move through the pressure relief aperture 30 to the top of the endcap 24. The purpose is to allow the pressure to equalize across the gasket at the top and to avoid putting undue stresses on the endcap 24 or the axial seal gasket 26.

The pressure downstream of the media is always less than the upstream pressure (when the filter is flowing fluid). This differential pressure can be quite high in cases where the filter is plugged, the velocity is high, or the fluid is cold and viscous. When a pressure relief aperture 30 is provided, this pressure is carried to the top of the upper endcap 24 and causes an unbalanced force to be placed on the upper endcap 24, tending to force it into the housing. In practicing this aspect of the invention, this force is counterbalanced in the housing. The unbalanced force is due mainly to the center of the endcap 24 which has the upstream pressure on one side, and downstream pressure on the bottom side. The unbalanced force is in the downward direction and tries to push the cartridge into the housing and crush the element. The cartridge has the aforementioned shoulders 29b on the bottoms of the ribs 29, and these seat against a stop 29c to provide a positive stop for the top endcap and thus seat the overall filter in the housing.

Figure 3:
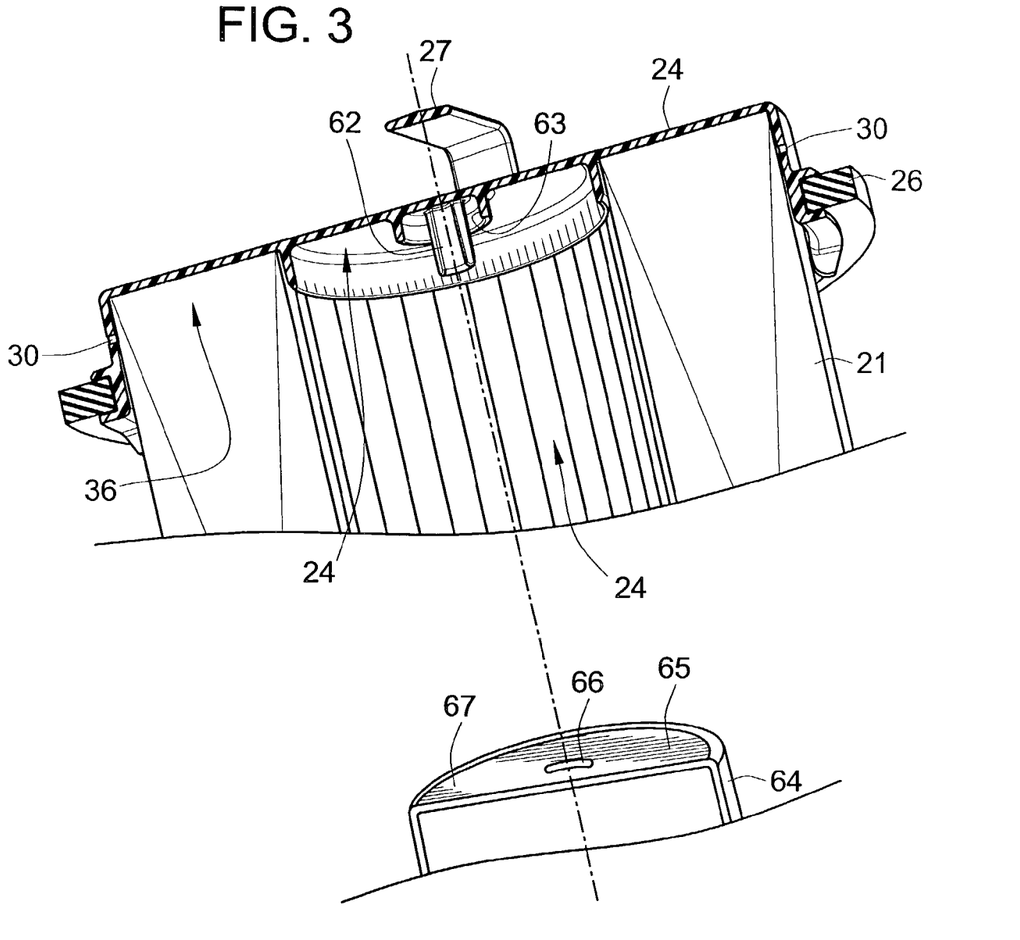
FIG. 3 is a partial enlarged view showing the upper endcap with key.
Figure 4:
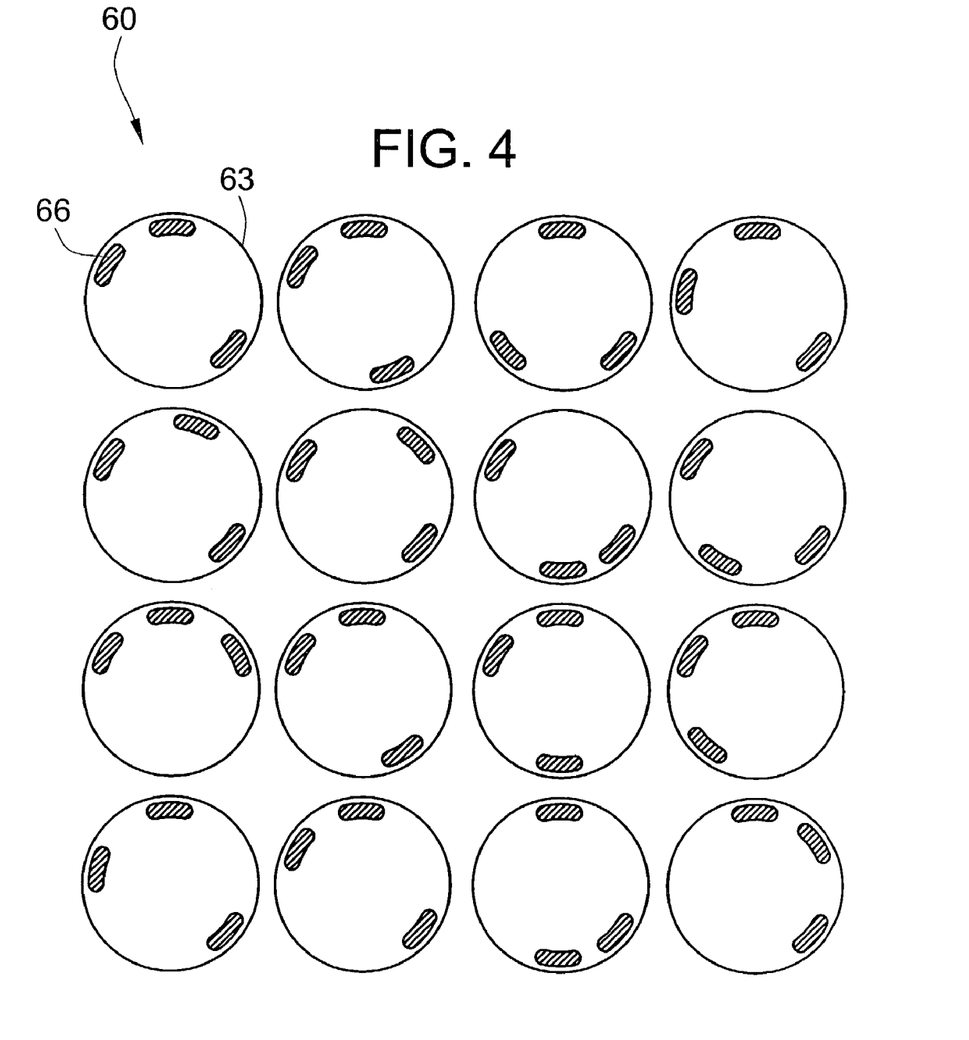
FIG. 4 is a diagram illustrating a plurality of key positions.

FIGS. 3 and 4 illustrates a keying feature which can be used in the practice of the present invention. The inside 24a of the upper endcap 24 is provided with a plurality of key positions, best illustrated in FIG. 4. It will be seen that at a given radius from the center of the endcap 24, a plurality of key positions 60 are provided. The illustrated embodiment includes eight key positions in a single ring. More or fewer key positions per ring, as well as additional rings can also be provided, but it is believed that the eight key positions, which can provide the sixteen possibilities illustrated in FIG. 4, is adequate for most applications.

Referring primarily to FIG. 3, it will be seen that a single key 62 is provided on the underside of the illustrated endcap in a given position. While only a single key is shown, as contrasted with the three keys of FIG. 4 it is believed that the single key will adequately illustrate the invention without overcomplicating the drawings. The key is in a fixed angular position with respect to the key circle 63 (the circle in which the keys are located). The key 62 projects into the internal bore 21a of the filter element 21. FIG. 3 shows a portion of the housing centertube 64 having a top surface 65 which is substantially solid except for a key opening 66. The upper surface 65 of the centertube has a plurality of key positions in a key circle 67 in the same pattern as illustrated in FIG. 4. However, instead of projections 62, the keys in the upper surface 65 are apertures to receive the projections. FIG. 3 shows a single aperture 66 positioned in the key circle 67 to engage the single projection 62 positioned in the key circle 63. Thus, when the filter is installed in the housing, the keys will align and allow the filter to reach the seated position, allowing the cover to be placed on the housing and operation to continue. If the wrong filter inserted, the filter will not seat, and the user will be incapable of completing assembly.

This feature is particularly significant when using a universal housing as illustrated in this application. For example, two housings might be used side-by-side to provide a primary and a secondary fuel filter system. Both housings would be of the same diameter and height, but would require different filter cartridges. The keys will prevent the cartridges for one of the housings from being installed incorrectly in the other housing. It would be a simple matter to have several different key configurations to suit various applications and indeed various customers.

The assembly of the filter will now be briefly described, primarily with reference to FIG. 2. Basically the endcaps 22, 24 are potted onto the filter element 21 in whichever sequence the manufacture desires. Using conventional techniques, an end of the filter element is placed, for example, in the channel 31 of the lower endcap, and potting material (epoxy, plastisol, hot melt or urethane) is introduced into the channel 31 to seal the ends of all the pleats and join them to the endcap 22. A similar operation is performed on the other end in connection with endcap 24. The gaskets 26, 23 can be preinstalled before potting, or are preferably installed after potting by simply stretching the gaskets and snapping them into place. The filter is then ready for packaging and ready for use by the ultimate consumer. The fact that the gaskets are so reliably joined to the filter makes changing a cartridge filter constructed in accordance with this invention about as simple as changing a spin-on filter. The result, however, is that the spent filter can be disposed of by incineration, rather than contributing to landfill waste.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An environmentally friendly filter cartridge constructed to fit in a filter housing, the filter cartridge containing no metal parts, and comprising in combination:
   a cylindrical filter element having an internal bore which has no integral supporting centertube but of a size capable of sliding over a centertube in a corresponding housing,
   a pre-molded plastic endcap having an open center corresponding to the internal bore and sealed to the filter element at a first end thereof,
   an annular groove formed near the outer periphery of the first endcap,
   a radial seal gasket having a peripheral mounting bead sized to be stretched and snap fit into the groove in the first endcap, the radial seal gasket having a depending skirt coaxial with the filter element and positioned at about the outer periphery of the filter element,
   a second pre-molded plastic closed endcap, the second endcap having a closed end, the second end of the filter element being sealed to the second endcap, the second endcap having an annular groove at the outer periphery thereof,
      a disc-like axial seal gasket stretch fit into the groove and projecting from the outer periphery of the second end cap to provide an axial seal,
   a pressure equalizing aperture at a circumferential portion in the second endcap for equalizing the pressure differential across the closed second endcap during filter operation, and support shoulders on a plurality of tapered ribs formed around the circumferential portion of the second endcap adjacent the annular groove for assisting in centering the cartridge and resisting crushing forces applied to the second endcap during filtration operation of the filter cartridge.

2. The filter cartridge as in claim 1 wherein the second endcap further includes a handle projecting from the upper portion of the second endcap for facilitating user manipulation of the filter cartridge.

3. The filter cartridge as in claim 1 further including a complimentary housing for receiving the filter cartridge, the housing having a centertube fixed therein for supporting the inner bore of the cartridge when inserted in the housing, and a cover threaded onto the housing in such a way as to compress the axial seal gasket between the cover and the housing, the pressure equalization aperture serving to equalize the pressure in the area between the second endcap and the cover to prevent bowing of the second endcap under operating pressure.

4. The filter cartridge as in claim 3 wherein the plurality of tapered ribs are positioned near the periphery of the second endcap and the plurality of tapered ribs are oriented to assist in centering the cartridge in the housing, the cartridge having shoulders formed on a lower portion of the plurality of tapered ribs, and the housing having an annular ridge for supporting the shoulders to resist crushing pressures on the filter cartridge under operating pressure.

5. The filter cartridge as in claim 3 wherein the housing includes an annular sealing flange at the bottom thereof positioned and sized to engage the skirt of the radial seal gasket when the cartridge is inserted in the housing.

6. The filter cartridge as in claim 3 wherein the second endcap has a plurality of key positions, at least one key installed in a selected one of said positions, the housing centertube having a top surface, a plurality of keyed positions in the top surface, and a slot formed in a selected one of the keyed positions to mate the key in the filter cartridge.

7. The filter cartridge as in claim 6 wherein a plurality of keys are provided in the cartridge and a corresponding plurality of slots are provided in the top surface of the centertube.

8. The filter cartridge as in claim 5 wherein operating pressures on the radial seal gasket force the gasket against both the first endcap of the filter and the sealing flange of the filter housing.

* * * * *

UNITED STATES PATENT AND TRADEMARK OFFICE
CERTIFICATE OF CORRECTION

PATENT NO. : 7,168,573 B2  Page 1 of 1
APPLICATION NO. : 10/457187
DATED : January 30, 2007
INVENTOR(S) : Brown et al.

It is certified that error appears in the above-identified patent and that said Letters Patent is hereby corrected as shown below:

Title page, item [57]

In the Abstract:

Line 6: "high-downward" should read --high downward--.

Signed and Sealed this

Twenty Second Day of April, 2008

JON W. DUDAS
*Director of the United States Patent and Trademark Office*